(12) United States Patent
Kreipe et al.

(10) Patent No.: US 6,383,315 B1
(45) Date of Patent: May 7, 2002

(54) PROFILE CLAMP AND METHOD FOR MANUFACTURING A PROFILE CLAMP

(75) Inventors: Hans-Jürgen Kreipe, Brachttal; Claus Dieter Weisheit, Bonndorf, both of (DE)

(73) Assignees: Rasmussen GmbH, Maintal (DE); Asea Brown Boveri AG, Baden (CH)

( * ) Notice: Subject to any disclaimer, the term of this patent is extended or adjusted under 35 U.S.C. 154(b) by 0 days.

(21) Appl. No.: 09/696,650

(22) Filed: Oct. 25, 2000

Related U.S. Application Data

(62) Division of application No. 09/226,184, filed on Jan. 5, 1999.

(30) Foreign Application Priority Data

Jan. 7, 1998 (DE) .......................................... 198 00 283

(51) Int. Cl.[7] ................................................. C21D 1/10
(52) U.S. Cl. ........................ 148/526; 148/567; 148/663
(58) Field of Search ................................ 148/526, 567, 148/663

(56) References Cited

U.S. PATENT DOCUMENTS

| | | | |
|---|---|---|---|
| 2,548,249 A | | 4/1951 | Woolsey |
| 2,756,079 A | | 7/1956 | Herman |
| 2,842,385 A | | 7/1958 | Webster et al. |
| 2,941,823 A | | 6/1960 | Good |
| 3,498,649 A | | 3/1970 | Pfeuffer |
| 3,964,773 A | | 6/1976 | Stade et al. |
| 4,181,845 A | * | 1/1980 | Bolton .......................... 266/87 |
| 5,645,303 A | | 7/1997 | Warehime et al. |
| 5,820,703 A | * | 10/1998 | Suzuki et al. ................ 148/593 |
| 5,830,290 A | | 11/1998 | Kreipe |

FOREIGN PATENT DOCUMENTS

| | | |
|---|---|---|
| DE | 1135249 | 8/1962 |
| DE | 30 38 491 C2 | 10/1980 |
| DE | 196 33 789 A1 | 8/1996 |
| FR | 618146 | 6/1926 |
| FR | 1016629 | 4/1950 |
| FR | 1150947 | 5/1956 |
| FR | 1160318 | 11/1956 |
| GB | 854629 | 4/1959 |
| GB | 2016627 | 3/1979 |
| JP | 60-92426 | * 5/1985 |

OTHER PUBLICATIONS

Brochure: "NORMA Conical Flange Joints," Apr. 1979.
Brochure: "NORMA Conical Flange Joints," Oct. 1988.
Brochure: "NORMA Profile Clamp with Conical Flange," Nov. 1996.

* cited by examiner

*Primary Examiner*—George Wyszomierski
(74) *Attorney, Agent, or Firm*—Darby & Darby

(57) ABSTRACT

A steel profile clamp is used to join flanged component parts. The profile clamp has at least partially conical side walls that are bent radially inwardly. The profile clamp has welding joints to maintain the shape of the clamp. The steel is martensitic for increased load-carrying capacity of the joint. The steel material, in an ambient temperature range of 20° C. to 750° C., has a coefficient of thermal expansion that is at least $0.3 \times 10^{-6}$ m/m° C. lower than that of the coefficient of thermal expansion of a ferritic casting material. The method for manufacturing the profile clamp includes pre-quenching and tempering the material of the profile clamp when it is in the form of a strip. After forming and welding the profile clamp, the weld is subject to induction tempering.

3 Claims, 1 Drawing Sheet

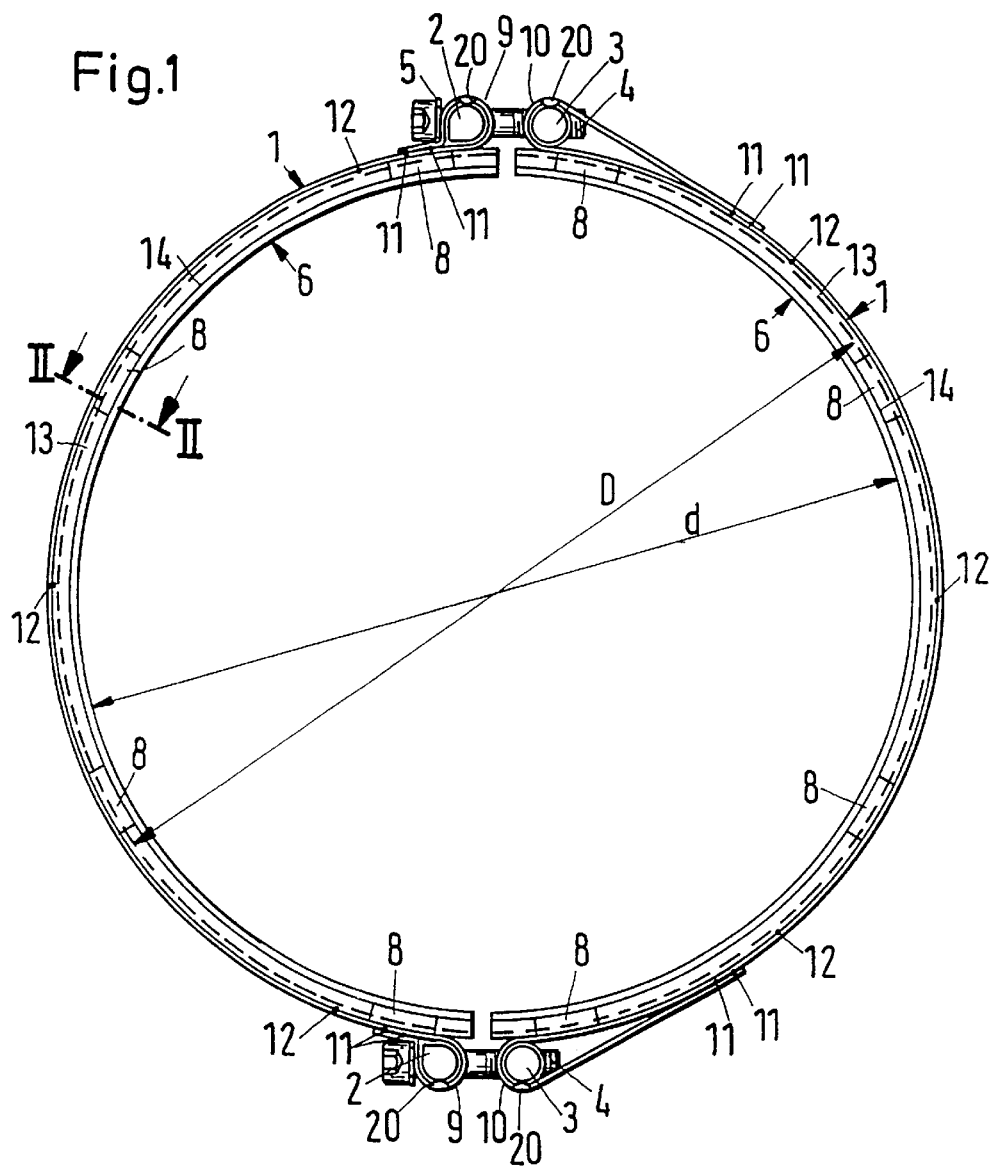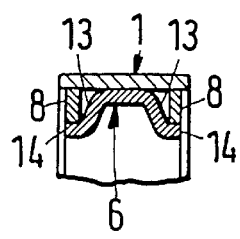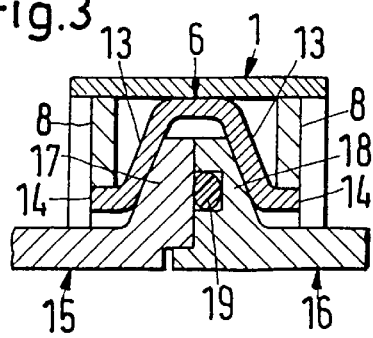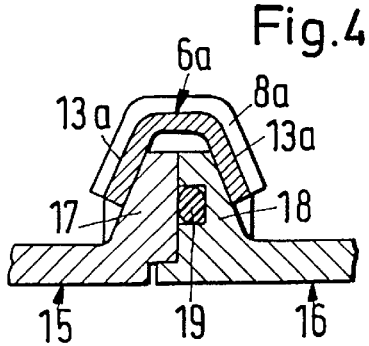

PROFILE CLAMP AND METHOD FOR MANUFACTURING A PROFILE CLAMP

This is a division, of application Ser. No. 09/226,184, filed Jan. 5, 1999. Each of these prior applications is hereby incorporated herein by reference, in its entirety.

BACKGROUND OF THE INVENTION

1. Field of the Invention

The present invention relates to a profile clamp and a method for manufacturing the profile clamp. More specifically, the present invention relates to a profile clamp, having conical side walls that are bent radially inwardly, for connecting components that have flanges at their respective ends.

2. Discussion of the Related Art

Profile clamps, per sé, are known, for example, from German Reference DE 30 38 491 C2, U.S. Pat. Nos. 3,498,649, 3,964,773, French Reference No. 1,016,629 and from the brochures "NORMA Conical Flange Joints", © 1979 and 1988, "NORMA Profile Clamp with Conical Flange",© November 1996. These known profile clamps are made of ferritic or pure austenitic steel. They are manufactured by pure cold forming, with subsequent welding. These steel profile clamps are not stable at relatively high temperatures. Alternatively, they have too high of a coefficient of thermal expansion [$18 \times 10^{-6}$ to $22 \times 10^{-6}$ m/m° C. (for austenitic, creep-resistant steels)], which causes loss of elasticity at high temperatures and, thus, leakages in the joint.

The housings of turbochargers for large diesel engines or gas turbines are currently made of ferritic casting materials which, in the range of 20° C. to 600° C., have a coefficient of thermal expansion that ranges from $10 \times 10^{-6}$ to $14 \times 10^{-6}$ m/m° C. as the temperature changes. Thus, the known profile clamps, which are made of ferritic or pure austenitic steel, are not suited to join the housing or other components of turbo chargers because the joint would leak at temperatures up to 750° due to the excessively high coefficients of thermal expansion of the conventional clamp material. Leaking joints will, among other things, lead to a substantial loss of output from the turbochargers.

In addition, a leaking or loosening connection constitutes a security risk, because turbochargers that have been assembled with these clamps could burst as a result of the loose connection, thereby increasing the risk of injury.

SUMMARY OF THE INVENTION

It is an object of the present invention to provide a profile clamp and a method for manufacturing the profile clamp that may be used to reliably secure ferritic, pearlitic casting materials of components through which hot gas flows while meeting the desired requirements of tightness and stability in a temperature range up to 750° C.

These and other objects are achieved with a profile clamp made of a martensitic steel, which, at an ambient temperature of 20° C. to 750° C., has a coefficient of thermal expansion that is at least $0.3 \times 10^{-6}$ m/m° C. lower than that of a ferritic casting material.

Martensitic steel has a high degree of hardness at very high temperatures and, therefore, withstands high forces that are exerted on the point of junction without being deformed. Furthermore, as a result of the selection of the coefficient of thermal expansion, the profile clamp expands slightly less than the components that are being joined, which are made of a ferritic casting material. The clamping force exerted by the profile clamp on the flanges of the components to be joined increases as the temperature of the joint rises, thereby ensuring that the components will be held together not only due to the lower deformability of the profile clamp, but also because the clamping force increases with rising temperature. Thus, in use, the profile clamp according to the present invention not only avoids the dangers described above, but also avoids the costly manner that is currently used to bolt known profile clamps, which may include the use of additional clamping rings that are fitted with holes for the insertion of screws to further secure the joint.

The profile clamp is made of a steel that is comprised of iron as its main constituent. The remaining constituents, in percentage by weight, are as follows: up to 0.45% C, up to 2.0% Si, up to 2.0% Mn, up to 0.04% P, up to 0.04% S, 15 to 20% Cr, from 1 to 8% Ni, up to 2.5% Mo, up to 0.5% V, up to 0.1% Al, up to 0.1% Co, up to 0.4% Cu, up to 0.4% Pb, up to 0.1% Se, up to 0.1% Te, up to 0.5% Ti, up to 0.1% W, up to 0.05% Zr, up to 0.01% O, up to 0.01% N, up to 0.1% Bi, up to 0.001% B, up to 0.05% Nb.

In a currently preferred exemplary embodiment, the maximum amount of C is 0.4%, of Si is 0.5%, of Mn is 0.8% and of Mo is 2.0%, and the minimum amount of Ni is 1.0%, of Mo is 0.3% and of V is 0.25%.

The profile clamp in one exemplary embodiment of the present invention has at least one clamping band with its end sections being bent radially outwardly and back to form loops. The ends of the end sections are welded to the clamping band. A bolt is disposed in each loop. Each loop has a slit that extends around a major portion of the bolt. The bolts in adjacent loops are connected by a headed clamping bolt. The clamping bolt shaft extends through the slits in the loops. At least one circular ring segment is welded to a radial inner surface of the clamping band. The circular ring segment has conical side walls so that, in axial cross-section, the ring segment is approximately hat-shaped. The conical side walls are fitted with a plurality of reinforcements. One of the bolts disposed within the loops has, in axial cross-section, an approximately tear drop shape with its sides enclosing a right angle. One of the sides of the tear drop shaped bolt extends radially outwardly away from the clamp circumference and the other side extends approximately in the circumferential direction of the clamp. The loop enveloping the tear drop shaped bolt has a matching cross sectional shape. The clamping bolt head is supported on the side of this matching loop that extends radially outwardly and away from the clamp circumference. The profile clamp according to this embodiment withstands, on the basis of its shape alone, very high axial forces, such as may occur in profile clamps with diameters of up to 500 mm and higher. Nevertheless, the clamping band is sufficiently flexible to adapt perfectly to the diameter of the flanges of the components to be joined together because of the separate construction of the semi-circular profiled ring segments and their connection to the clamping band in a circumferential direction. Because the clamping bolt head is supported on the side of the loop, the width of the slit formed in this loop is smaller than in known profile clamps where the clamping bolt head is supported directly on the bolt disposed within the loop. Thus, the clamp according to the present invention has a slit width in the loop that is approximately equal to the diameter of the clamping bolt shaft so that the loop can withstand higher tension forces. Additionally, the clamping bolt head is supported on a large surface on an approximately radially extending side of the loop, without putting stress on the loop with the edge of the clamping bolt head.

In accordance with an alternate exemplary embodiment of the profile clamp according to the present invention, the clamp has at least one circular ring segment having end sections that are bent radially outwardly and back to form loops at each end section. The end sections are welded to the circular ring segment. A bolt is disposed within each of the loops. Each loop has a slit extending around a major portion of the bolt. The bolts in adjacent loops are connected by a headed clamping bolt. The clamping bolt shaft extends through the slits in the loops. The circular ring segment includes conical side walls so that, in axial cross-section, the ring segment is approximately hat-shaped. The conical side walls have a plurality of reinforcements. One of the bolts in the adjacent loops has, in axial cross-section, an approximately tear drop shape with its sides enclosing a right angle. One of the sides of the bolt extends approximately radially outwardly away from the clamp circumference and the other side extends in the circumferential direction of the clamp. The loop surrounding the tear drop shaped bolt has a matching cross-sectional shape. The clamping bolt head is supported on a side of the matching shape loop that extends radially outwardly away from the clamp circumference. In this embodiment, one circular ring segment may be used, as opposed to two, if slightly lower joining forces can be applied by the profile clamp on the components to be joined.

The reinforcements are preferably made of sheet metal and are welded to the conical side walls. These sheet metal reinforcements ensure that the side walls have a very high flexural strength.

A plain washer, having a diameter larger than that of the head of the headed clamping bolt, is disposed between the head of the headed clamping bolt and the loop. Such a plain washer facilitates not only the tightening of the clamp bolt, but also reduces the surface pressure between the clamping bolt head and the side of the loop.

The method for manufacturing the profile clamp according to the present invention includes the material being prequenched and tempered while in the form of a strip. Thereafter, the clamping band is shaped and welded. The welds are subject to an induction tempering treatment for structural homogenization of the profile clamp. By prequenching and tempering, optimal technological properties are obtained in the steel. The induction tempering, which preferably occurs after controlled cooling of the welds, avoids or at least reduces the risk of crack formation in the area of the welds.

The induction tempering treatment is preferably a short-term spheroidization that takes place for less than 5 minutes. The spheroidization preferably occurs in the range of the Ac1 temperature, which results in optimal structural formation in the welding zones.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a side view of a first exemplary embodiment of a profile clamp in accordance with the present invention;

FIG. 2 is a cross-sectional view taken along lines II—II of FIG. 1, and looking in the direction of the arrows;

FIG. 3 is a cross-sectional view similar to FIG. 2, but on a slightly enlarged scale and with the profile clamp being shown in the clamped position joining two flanges of housing components of a turbocharger; and FIG. 4 is a cross-sectional view similar to FIG. 3 of a second exemplary embodiment of a profile clamp according to the present invention.

DETAILED DESCRIPTION OF THE PRESENTLY PREFERRED EXEMPLARY EMBODIMENTS

Referring now to FIGS. 1–3, a profile clamp according to the present invention is illustrated. The profile clamp includes two approximately semicircular clamping bands 1, four bolts 2, 3, two clamping bolts 4, two plain washers 5, two approximately semicircular ring segments 6 and a plurality of reinforcements, which are preferably in the form of sheet metal strips 8. Sheet metal strips 8 are distributed over the circumference of the clamp on both sides of the circular ring segments 6. Each clamping band 1 has end sections that are bent radially outwardly and back to form loops 9. The ends of the clamping band 1 are welded by, for example, projection welds 11, to the clamping band 1 to maintain the shape of the loops 9, 10. One bolt 2, 3 is placed within each loop 9, 10. Each loop 9, 10 has a slit extending around a major portion of the respective bolts 2, 3. One of the headed clamping bolts 4 has its shaft extend through the slits within the loops 9, 10. The shaft of bolt 4 also extends through a bore in bolts 2, 3. Bolt 2 has a threadless radial throughbore to receive the shaft of bolt 4. Bolt 3 has a threaded throughbore, which mates with the threaded shaft of clamping bolt 4. Bolt 2 has an approximately tear drop shaped axial cross-section with its sides enclosing an extensive right angle (See FIG. 1). One side of bolt 2 extends radially outwardly away from the clamp circumference. The other side of bolt 2 extends in the circumferential direction.

The axial cross-sectional shape of loop 9, which surrounds bolt 2, matches the axial cross-sectional shape of bolt 2. The head of clamping bolt 4 is supported by a plain washer 5 on the side of loop 9 that extends radially outwardly away from the clamp circumference. The head of clamping bolt 4 is, therefore, supported on a large surface by plain washer 5 at the side of loop 9. The slit formed in loop 9 can have a lesser width, corresponding approximately to (or more accurately, just slightly greater than) the diameter of the shaft of clamping bolt 4, as compared to when the clamping bolt head extends through the slit of the loop 9 and is supported directly on bolt 2. Thus, loop 9 withstands a relatively high clamping force, which equals that of loop 10.

A circular ring segment 6 is welded at welding locations 12 to the inside of each clamping band 1. In axial cross-section, the welding locations 12 are distributed over the circumference of band 1. The side walls 13 of the circular ring segments 6 have flanges 14 that extend in a circumferential direction and project axially in opposite directions. Thus, the axial cross-section of the circular ring segments 6 corresponds approximately to a hat with a brim. Flanges 14 increase the stiffness of side walls 13.

The side walls 13 are provided with reinforcements in the form of sheet metal strips 8. The sheet metal strips 8 are welded by means of a welding rod to the flanges 14 of the side walls 13 and to the inside of the clamping bands 1. Thus, the sheet metal strips 8 additionally increase the stiffness of the side walls 13 against an axial bending up due to the high axial stress on the joint from the two components 15, 16 joined by the profile clamp. In a currently preferred exemplary embodiment, the two components 15, 16 are housing components of a turbocharger for a diesel engine or a gas turbine, which are made of ferritic casting material and are exposed to temperatures up to 750° C. Housing components 15, 16 each have a flange 17, 18. Flanges 17, 18 have truncated cone-shape sides that are remote from each other when the housing components are joined against one another. The sides of the flanges 17, 18 that face each other are sealed by a wave-like rotating metal seal 19, which is illustrated in FIG. 3 in diagrammatic representation as an O-ring. The incline of the side walls 13 of the circular ring segments 6 mates with the incline of the truncated cone-shaped sides of flanges 17 and 18. The inside diameter D (see FIGS. 1 and 3) of the circular ring segments 6, in the clamped state of the profile clamp, is slightly larger than the outside diameter of the flanges 17, 18. The inside diameter d of flanges 14, in the clamped state of the profile clamp, is slightly larger than the outside diameter of the components 15, 16 (axially outside of flanges 17, 18) to be joined.

The profile clamp according to the present invention is not only suited to join housing components of a turbocharger, but also can join other components, such as, for example, pipes having flanges corresponding to flanges 17, 18. The profile clamp is especially suited to join components through which very hot fluids (i.e., liquids, gases or vapors) flow with temperatures of up to 750° C.

The steel used for the clamping bands 1 and the circular ring segments 6 is martensitic and has, at an ambient temperature of 20° C. to 750° C., a coefficient of thermal expansion that is smaller than the coefficient of thermal expansion of a ferritic casting material by at least $0.3 \times 10^{-6}$ m/m° C. The profile clamp expands, up to a temperature of 750° C., less than the components 15, 16 that the clamp is joining together and, thus, ensures, at least up to about 750° C., a firm closure of these components. The clamping bands 1 have a thickness of about 3 mm and a width of about 30 mm. The sheet metal of the circular ring segments 6 and the sheet metal strips 8 also have a thickness of about 3 mm. The diameter D can be in the range of 350 to 550 mm. The sheet metal strips 8 extend in a circumferential direction at an arc angle of about 15°.

The method for manufacturing the welded profile clamp made of matensitic steel in accordance with the present invention for special applications under temperature conditions of up to 750° C. is described in greater detail below, referring to the exemplary embodiments of the clamping bands 1, circular ring segments 6 and metal sheet metal strips 8. The table below lists a composition mixture for a preferred embodiment of the profile clamp and three (3) alternative embodiments. The composition mixture is comprised mainly of iron. The remaining constituents are listed in the table below by weight percentage.

TABLE 1

| Element | % by Weight | 1st Alternative | 2nd Alternative | 3rd Alternative |
|---|---|---|---|---|
| C | ≦0.45 | 0.15–0.25 | 0.20–0.35 | ≦0.12 |
| Si | ≦2.0 | 0.2–0.8 | ≦1.4 | ≦1.5 |
| Mn | ≦2.0 | 0.4–1.0 | 0.4–1.0 | ≦1.2 |
| P | ≦0.04 | ≦0.025 | ≦0.035 | ≦0.04 |
| S | ≦0.04 | ≦0.015 | ≦0.020 | ≦0.03 |
| Cr | 15–20 | 15.5–16.0 | 16.5–18.0 | 16–18 |
| Ni | ≦2.5 | 0.3–0.8 | 1.0–1.5 | 1.5–2.5 |
| Mo | ≦2.5 | 0.3–0.8 | 1.0–1.5 | 1.5–2.5 |
| V | ≦0.5 | ≦0.5 | 0.10–0.15 | ≦0.5 |
| Al | ≦0.1 | ≦0.1 | ≦0.1 | ≦0.1 |
| Co | ≦0.1 | ≦0.1 | ≦0.1 | ≦0.1 |
| Cu | ≦0.4 | ≦0.4 | ≦0.4 | ≦0.4 |
| Pb | ≦0.4 | ≦0.4 | ≦0.4 | ≦0.4 |

TABLE 1-continued

| Element | % by Weight | 1st Alternative | 2nd Alternative | 3rd Alternative |
|---|---|---|---|---|
| Se | ≦0.1 | ≦0.1 | ≦0.1 | ≦0.1 |
| Te | ≦0.1 | ≦0.1 | ≦0.1 | ≦0.1 |
| Ti | ≦0.5 | ≦0.5 | ≦0.5 | ≦0.5 |
| W | ≦0.1 | ≦0.1 | ≦0.1 | ≦0.1 |
| Zr | ≦0.05 | ≦0.05 | ≦0.05 | ≦0.05 |
| $O_2$ | ≦0.01 | ≦0.01 | ≦0.01 | ≦0.01 |
| N | ≦0.01 | ≦0.01 | ≦0.01 | ≦0.01 |
| Bi | ≦0.1 | ≦0.1 | ≦0.1 | ≦0.1 |
| B | ≦0.001 | ≦0.001 | ≦0.001 | ≦0.001 |
| Nb | ≦0.05 | ≦0.05 | ≦0.05 | ≦0.05 |

The composition mixture is melted in a blast furnace, poured off and rolled into a strip. The hot rolled wide strip is further rolled, split (i.e., cut into smaller strips), prequenched, tempered and rounded off on the edges. The material is annealed between the individual production stages. After prequenching and tempering, the narrow strip is subjected to an equalizing roll pass. In other words, the strip is rolled, by light cold forming, until it reaches its desired dimensions.

By means of several stamping and bending processes, the clamping bands 1 and circular ring segments 6 of the profile clamp are produced from the equalized narrow strip. The sheet metal strips 8 are also stamped out from the equalized narrow strip. The loops 9, 10 on the clamping bands 1 are then closed by forming projection welds 11. Clamping bands 1 are then stored in a heat retaining box, where the clamping bands 1 are maintained slightly above the martensite start temperature ($M_s$) at 200 to 350° C. until they are to be treated with an induction tempering process.

The induction tempering process is preferably carried out by a short-term spheroidization, for preferably less than 5 minutes. The excess carbon, which was set free by welding is separated into fine carbides. These fine carbides counteract a reduction of the admissible tensile stress load even with high temperatures. The fine carbides also increase the high-temperature strength of the material. Spheroidization proceeds preferably about the Ac1 temperature, which is the border line between the ferritic and austenitic area of the iron-carbon diagrams.

In an example of a hot drawn specimen according to the first alternative of table 1, the 0.2% proof stress for various temperatures of a furnace quenched and tempered specimen are compared in the following table with those of an induction-quenched and tempered specimen with spheroidization.

| Test Temperature | Specimen Furnace-Tempered to 1200 N/mm$^2$ | Specimen Induction-Tempered to 1200 N/mm$^2$ with Spheroidization |
|---|---|---|
| 500° C. | 430 N/mm$^2$ | 550 N/mm$^2$ |
| 600° C. | 305 N/mm$^2$ | 410 N/mm$^2$ |
| 650° C. | 170 N/mm$^2$ | 230 N/mm$^2$ |
| 700° C. | 90 N/mm$^2$ | 125 N/mm$^2$ |
| 750° C. | 60 N/mm$^2$ | 70 N/mm$^2$ |

The circular ring segments 6 are profiled from the narrow strip and rolled to the desired diameter. In a further welding process, the preformed welded and tempered clamping bands 1 are joined to the circular ring segments 6. Additionally, sheet metal strips 8 are joined, by welding, to clamping bands 1 and circular ring segments 6. After welding, a further tempering process is performed to prevent formation of cracks and to improve the weld texture.

The bolts 2, 3, which are produced separately from steel, are then introduced into each of the loops 9 and 10. Bolts 2, 3 are secured axially in loops 9, 10 by radially pressing inwardly short sections 20 of the loop borders near the two ends of the bolts 2, 3. Subsequently, clamping bolts 4 are inserted through the throughbores in bolts 2, 3. The profile clamp is now assembled and the clamp may be tightened by threading clamping bolt 4 further into the threaded throughbore of bolt 3.

Referring now to FIG. 4, another exemplary embodiment of the profile clamp according to the present invention is illustrated. In this embodiment, the use of clamping bands 1 have been eliminated. Instead, circular ring segments 6*a* have their end sections bent radially outwardly and back to form loops 9, 10. Bolts 2, 3 are inserted in these loops 9, 10 in a manner similar to the first embodiment. Furthermore, the use of flanges 14 has also been eliminated. The reinforcements are again designed in the form of bent sheet metal strips 8*a*. Sheet metal strips 8*a* extend radially over the circular ring segments 6*a* and are welded to ring segments 6*a*. The plane of the sheet metal strips 8*a* extends normal to the circumferential direction of the circular ring segments 6*a*. Several sheet metal strips 8*a* are distributed about the circumference of the circular ring segments 6*a*.

Instead of using sheet metal strips 8*a* as a reinforcement, the reinforcements can also be designed in the form of reinforcing creases that are pressed radially outwardly in the strip material of the circular ring segments 6*a*. The creases extend circumferentially in an arc just as the sheet metal strips 8*a* extend across the circular ring segments 6*a*.

The profile clamp according to FIG. 4 is manufactured in a manner to similar the profile clamp according to FIGS. 1–3. Thus, the circular ring segments 6*a* are produced in a manner similar to clamping bands 1 of the first embodiment. Circular ring segments 6*a* are welded to metal sheets 8*a*, and, thereafter, a tempering treatment is performed again to avoid crack formation and to refine the weld texture.

The joint produced by the profile clamp according to the present invention is especially useful in turbochargers and waste gas installations. The profile clamp results in a substantial savings in material, time expenditure during assembly and a corresponding reduction in costs.

Having described the presently preferred exemplary embodiment for a profile clamp and method for manufacturing the same in accordance with the present invention, it is believed that other modifications, variations and changes will be suggested to those skilled in the art in view of the teachings set forth herein. For example, only one clamping band 1 with more than two circular ring segments 6 may be used. Alternatively, clamping band 1 can have only one circular ring segment 6*a* with only one closure, which would include two bolts 2 and 3, two loops 9 and 10, and the clamping bolt 4, as well as a flexible pivot location located approximately diametrically opposite to the closure. Flanges 13*a* would be interrupted at the pivot location. It is, therefore, to be understood that all such modifications, variations, and changes are believed to fall within the scope of the present invention as defined by the appended claims.

What is claimed is:

1. A method for manufacturing a profile clamp for joining flanged components, said profile clamp being at least partially circular and having conical side walls that are bent radially inwardly, said profile clamp being made of martisistatic steel having, at an ambient temperature of 20° C. to 750° C., a coefficient of thermal expansion that is lower than a coefficient of thermal expansion of a ferritic casting material by at least $0.3 \times 10^{-6}$ m/m° C., said method comprising the steps of:

prequenching and tempering a strip of said steel;

forming a clamping band of said profile clamp by shaping and welding said strip to produce at least one welded area; and induction tempering said at least one welded area.

2. The method according to claim 1, wherein the induction tempering step includes spheroidization for less than 5 minutes.

3. The method according to claim 2, wherein said spheroidization is carried out at the Ac1 temperature.

* * * * *